United States Patent
Barnes et al.

(10) Patent No.: US 8,438,501 B2
(45) Date of Patent: May 7, 2013

(54) APPARATUS AND METHOD FOR PRESENTING MENU ITEMS ON USER INTERFACE OF CONSUMER ELECTRONICS DEVICE

(75) Inventors: Tracy Barnes, San Diego, CA (US); Andy Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 13/070,816

(22) Filed: Mar. 24, 2011

(65) Prior Publication Data

US 2012/0117512 A1    May 10, 2012

Related U.S. Application Data

(60) Provisional application No. 61/412,009, filed on Nov. 10, 2010.

(51) Int. Cl.
*G06F 3/048* (2006.01)

(52) U.S. Cl.
USPC ............ 715/811; 715/765; 715/810; 715/815

(58) Field of Classification Search .................. 715/764, 715/765, 810, 811, 815, 835
See application file for complete search history.

(56) References Cited

U.S. PATENT DOCUMENTS

| 7,865,841 | B2 * | 1/2011 | Morikawa | 715/811 |
| 2001/0019338 | A1 * | 9/2001 | Roth | 345/811 |
| 2010/0077354 | A1 * | 3/2010 | Russo | 715/834 |

* cited by examiner

*Primary Examiner* — Xiomar L Bautista
(74) *Attorney, Agent, or Firm* — John L. Rogitz

(57) ABSTRACT

A consumer electronics device has a video display, a processor controlling the display, and a computer readable storage medium accessible to the processor. The storage medium bears instructions executable by the processor to cause a user interface (UI) to appear on the display, where the UI includes plural alpha-numeric elements. Further, each element includes plural alpha-numeric characters arranged in a row. Even further, each element is characterized by a color, a row orientation, and a size, where at least the size is established at least in part by a frequency of selection of an element. Thus, at least a first element has a first color, first size, and first row orientation and at least a second element has a second color, second size, and second row orientation respectively different from the first color, first size, and first row orientation.

20 Claims, 4 Drawing Sheets

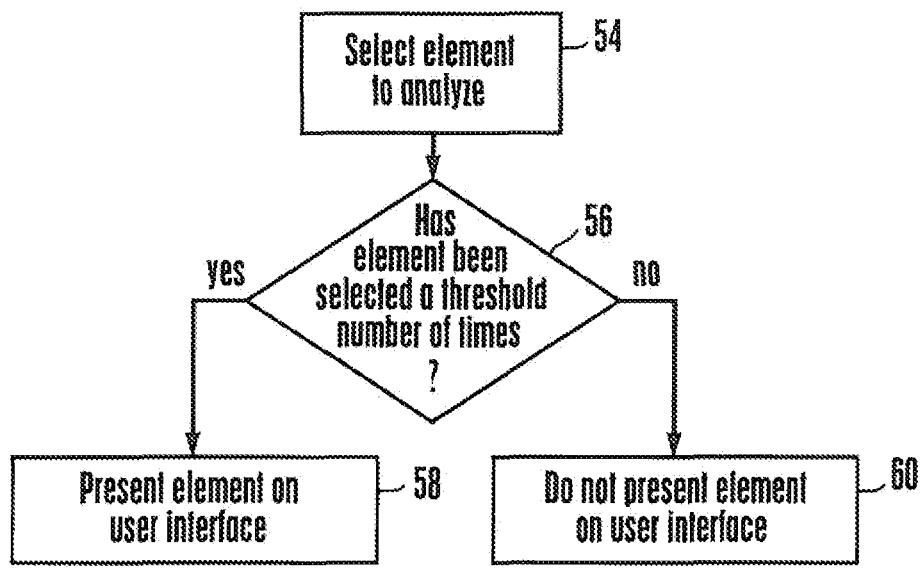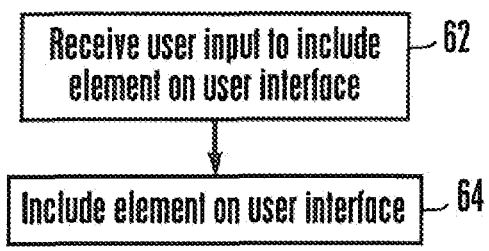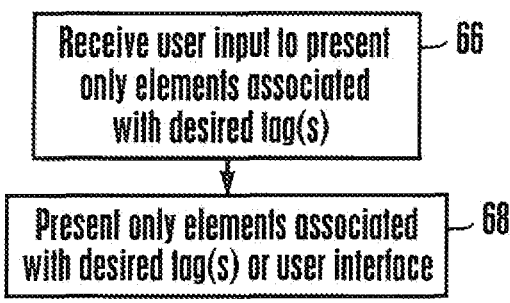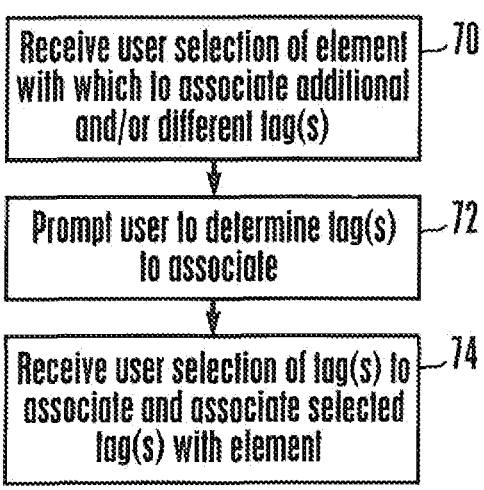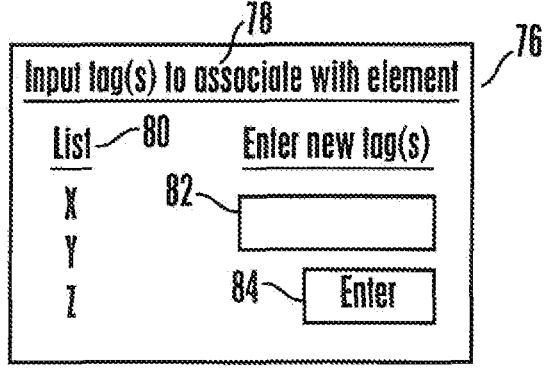

APPARATUS AND METHOD FOR PRESENTING MENU ITEMS ON USER INTERFACE OF CONSUMER ELECTRONICS DEVICE

This application claims priority from U.S. provisional patent application 61/412,009, filed Nov. 10, 2010, incorporated herein by reference.

I. FIELD OF THE INVENTION

The present invention relates generally to user interfaces of consumer electronics devices.

II. BACKGROUND OF THE INVENTION

User interfaces, which are common to consumer electronics (CE) devices, display menu items and the like to users so that users may select a particular function, item, data, application, etc. for use on the CE device. One particular configuration of a user interface utilized by CE devices is commonly referred to as the "stacked in time" format. Essentially, a "stacked in time" user interface splits user interfaces into layers, where selection of an item on one user interface thereafter yields presentation of a second user interface with additional items related to the selected item of the first user interface. In other words, a "stacked in time" user interface provides guidance to novice users of a CE device such that a "stacked in time" user interface presents only a necessary item and/or function at a given user interface, and thereafter presents related items and/or functions on a second user interface.

By way of example, a "stacked in time" format may have a first user interface that has a "music" menu item. By selecting the "music" menu item, a second user interface is presented on the CE device that presents categories, of music that are available. Thus, the second user interface may have menu items for "rock," "classical," and "country."

However, as understood herein there are several disadvantages to "stacked in time" user interfaces. One particular disadvantage is that navigating to a desired item or function through multiple user interfaces can be overwhelming and confusing to a novice CE device user. Another disadvantage is that, as a user becomes more familiar the "stacked in time" user interfaces of a CE device, navigation through the multiple user interfaces to select a desired item or function can become cumbersome and time-consuming.

SUMMARY OF THE INVENTION

Present principles recognize that an "adjacent in space" user interface in which. UI elements are (mostly) all on one screen avoids the hierarchy of user interfaces of the "stacked in time". Present principles further understand that is would be desirable that an "adjacent in space" user interface not appear confusing, cluttered, and complex and that it facilitate UI element selection without overly risking the inadvertent selection of an undesired element in close proximity to the desired element.

Accordingly, while presenting menu items (more broadly referred to herein as "elements," where the term "element" is to be limited only by the limitations set forth in the claims) on a single user interface may be desirable, the present application makes the following critical observation. Because a single user interface with multiple elements may appear, e.g., cluttered, a need has arisen for an apparatus and method for distinguishing elements from each other on a single user interface. In other words, the present application recognizes that to present multiple elements on a single user interface in a manageable and visually organized manner, the elements on a single user interface may have differing visual characteristics.

With the above in mind, a CE device has a video display. The CE device also has a processor controlling the display. A computer-readable medium that may be accessed by a processor may also be included on the CE device, where the medium may bear instructions executable by the processor to cause a user interface (UI) to appear on the display.

The UI above may include plural alpha-numeric elements, each element including plural alpha-numeric characters arranged in a row. Each element on the UI may be characterized by a color, a row orientation, and a size. The size of each element may be established at least in part by a frequency of selection of an element. Thus, a first element may have a first color, first size, and first row orientation based at least in part on the frequency upon which it is selected, while a second element may have a second color, second size, and second row orientation respectively different from the first color, first size, and first row orientation based at least in part on the frequency upon which it is selected. If desired, the orientation of elements may be in one or more rows, where the rows may be orientated horizontally and/or vertically on the display.

In some implementations, each element may be further characterized by its contrast compared to other elements, where the contrast of an element may be established at least in part by the frequency of selection of the element. In other words, contrast may be lighter for a first element that is selected relatively less frequently than a second element that is selected relatively more frequently than the first element. Thus, an element selected relatively more frequently may have a darker contrast than an element selected relatively less frequently.

Additionally, in some implementations, the processor may establish the size of a first element to be larger than the size of second element responsive to a determination by the processor that the first element is selected relatively more frequently than the second element. Even further, in some implementations, the processor may dynamically alter the size of an element responsive to a changing and/or varying frequency of selection of the element.

In non-limiting embodiments, the elements presented on a UI may also represent respective categories. The processor may thus highlight predetermined elements of categories belonging to a common genre for a predetermined period. After the predetermined period, the processor may cease to highlight the predetermined elements and thereafter may present the predetermined elements in non-highlighted form.

In another aspect, a method may include providing a CE device having a video display. The method may also include providing a processor that can control the display, as well, as a computer readable storage medium accessible to and by the processor. The storage medium may bear instructions executable by the processor to cause a UI to appear on the display.

The method may also include that the UI has plural alpha-numeric elements, where each element may include plural alpha-numeric characters arranged in a row. In non-limiting implementations, the method also includes at least a first element on the user interface that may be selected for characterization, wherein the processor may determine whether the first element is selected relatively more or less frequently than neighboring elements on the user interface.

If desired, the method may also include presenting the first element to a user in a particular color, particular size, and particular row orientation based at least in part on the frequency on which the first element is selected by a user of the CE device, where the CE device is presenting the user interface.

In still another aspect, a system may include a CE device, where the CE device may include a video display and a processor controlling the display. The CE device may also include a computer readable storage medium accessible to the processor and bearing instructions executable by the processor to cause a UI to appear on the display. If desired, the UI may include plural alpha-numeric elements, where each element includes plural alpha-numeric characters arranged in a row. Additionally, in non-limiting embodiments, the appearance of each element on the UI may be established at least in part by the frequency of selection of the element.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of non-limiting logic for determining whether an element has been selected a threshold number of times to be presented on a user interface in accordance with present principles;

FIG. 4 is a flow chart of non-limiting logic for presenting an element on a user interface based at least in part on user preference;

FIG. 5 is a flow chart of non-limiting logic for highlighting and/or filtering elements on a user interface configured to further distinguishing particular elements in accordance with present principles;

FIG. 6 is a flow chart of non-limiting logic for determining tags that may be associated with a particular element presented on a user interface in accordance with present principles;

FIG. 7 is a non-limiting block diagram of an exemplary prompt provided to a user to determine a tag(s) to associate with an element in accordance with present principles;

DETAILED DESCRIPTION OF THE PREFERRED EMBODIMENT

Figure 1:
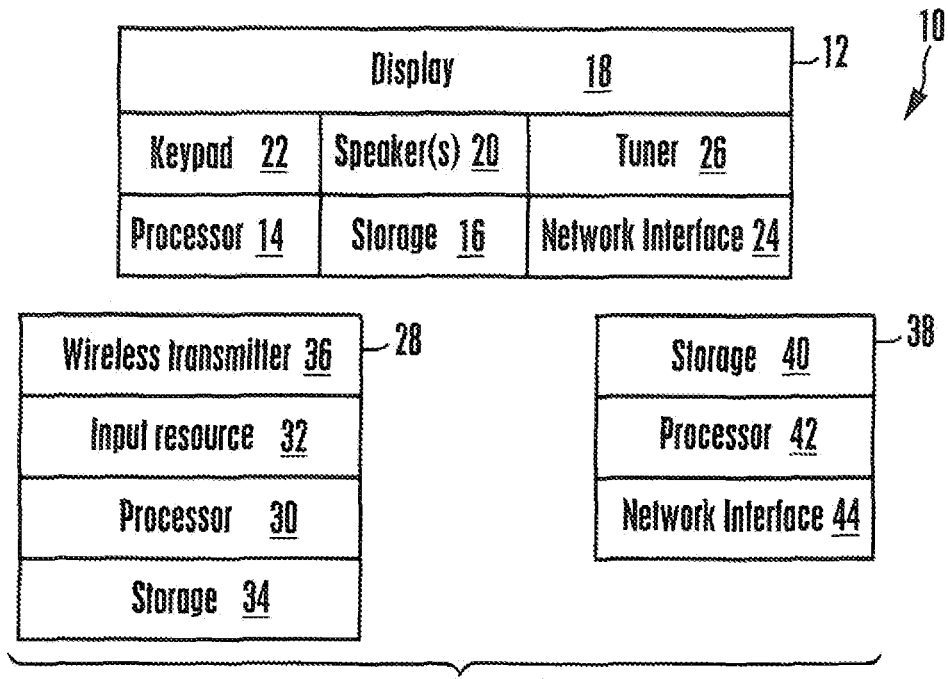
FIG. 1 is a non-limiting hardware block diagram of a system in accordance with present principles.

Referring initially to FIG. 1, a non-limiting, exemplary, hardware block diagram generally designated 10 is shown. The system 10 includes a consumer electronics (CE) device 12, the CE device 12 having a processor 14 capable of executing logic, such as the logic described herein. The CE device 12 may also include one or more non-transitory computer readable data storage medium(s) 16 such as, but not limited to, RAM-based storage (e.g., a chip implementing dynamic random access memory (DRAM)) or flash memory or disk-based-storage. Moreover, logic (such as the logic described herein) that is executable by the CE device 12 may be stored on the medium(s) 16 in accordance with present principles.

As shown in FIG. 1, the CE device 12 may also have one or more output devices such as a display 18 and speakers 20, where the output devices may be capable of presenting data and/or content such as audio and visual content to a user. The CE device 12 may also include one or more input devices capable of receiving input from a user, such as a keypad 22. However, it is to be understood that other input devices may also be included on the CE device 12, such as a personal computer "mouse" or a touch-screen input device. Even further, it is to be understood that the display 18 may also function as a touch-screen input device in non-limiting embodiments.

Continuing with FIG. 1, the CE device 12 may include a network interface 24 such as a wired or wireless modem or wireless telephony transceiver that may communicate with the processor 14 to provide connectivity to a wide area network such as the interne. The CE device 12 may also include a non-limiting tuner 26, where the tuner 26 may provide a means of wireless communication with a remote commander 28.

The remote commander 28 of FIG. 1 may have a processor 30 capable of executing user commands input through an input region 32, where the input region 32 may include control keys (not shown), may employ touch-screen technology, and/or may employ voice recognition technology in non-limiting embodiments.

The remote commander 28 may also have at least one data storage 34, which may be capable of storing data. The data storage 34 may store information regarding, e.g., preset channel memory corresponding to particular buttons on the remote commander 28. Even further, the remote commander 28 may include a wireless transmitter 36 which may receive input from the processor 30. The wireless transmitter 36 may be capable of producing a non-limiting electronic signal, such as an infrared signal, which may allow the transmitter 36 to communicate with the CE device 12 through the tuner 26. Thus, the wireless transmitter 36 may transmit user commands to the CE 12 that have been input into the remote commander 28 through the input region 32.

It is to be further understood that communication between the CE device 12 and the remote commander 28 through the tuner 26 and wireless transmitter 36, respectively, may occur over electro-magnetic waves, such as infrared or radio waves. Thus, it may now be appreciated that the remote commander 28 shown in FIG. 1 may be capable of communication with the CE device 12.

Still in reference to FIG. 1, a remote storage device 38 is also shown. In non-limiting embodiments, the remote storage device 38 may be an internet server capable of communication with devices such as the CE device 12 over, e.g., the internet.

Thus, the remote storage device 38 may have at least one non-transitory computer readable data storage medium 40 such as, but not limited to, RAM-based storage (e.g., a chip implementing dynamic random access memory (DRAM)) or flash memory or disk-based-storage. The storage medium 40 may be capable of storing information relating to at least one user, such as a user of the CE device 12. Alternatively, the storage medium 40 may be capable of storing information relating to a particular CE device, such as the CE device 12, in non-limiting embodiments.

Regardless, information stored on the medium 40 may include data, media files, and/or content stored on the remote storage device 38 and accessible by a user through the CE device 12. However, it is to be understood that data, media files, and/or content capable of presentation on the CE device 12 may also and/or alternatively be stored on the storage medium 16 of the CE device 12.

Furthermore; it is to be understood that the terms "data," "media content," "media files," and "content," as used herein, are non-limiting terms that may refer to a plurality of electronic data types and formats. Those electronic data types and formats include, but are not limited to, textual data, MP3 and other audio formats, electronic games, picture formats, video formats, and any other data format capable of presentation on a CE device, such as the CE device 12 described herein.

Moving on, the remote storage device 38 of FIG. 1 may also include a processor 42 capable of processing requests and/or commands received from the CE device 12 in accordance with present principles. The remote storage device 38 may also include a network interface 44, such as a wired or wireless modem or wireless-telephony transceiver, that may communicate with the processor 42 to provide connectivity to a wide area network such as the internet. Thus, it may be appreciated that the CE device 12 may communicate with the remote storage device 38 over the internet and/or through their respective network interfaces in non-limiting embodiments.

Thus, it may be appreciated that communication between the CE device 12 and storage device 38 may include an exchange of data between the CE device 12 and storage device 38. For example, the CE device 12 may download a software update from the storage device 38. In addition, the storage device 38 may provide content for presentation on the CE device 12 in non-limiting embodiments.

Concluding the present description of FIG. 1, it is to be understood that CE device 12, remote commander 28, and storage device 38 may include respective power supplies (not shown) to provide-voltage to the respective devices. For example, a battery or an AC/DC power supply may be included on the CE device 12, remote commander 28, or storage device 38.

Figure 2:
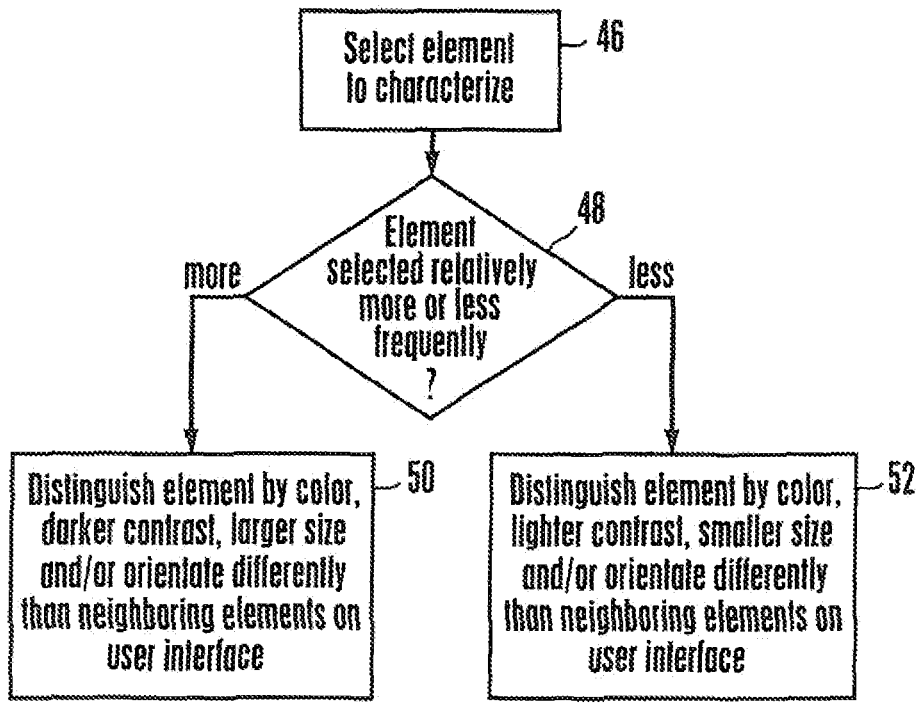
FIG. 2 is a flow chart of non-limiting logic for characterizing elements on a user interface.

Now in reference to FIG. 2, a flow chart of non-limiting logic for characterizing elements on a user interface is shown. Beginning with block 46, the logic selects an element on the user interface to characterize. Then, at decision diamond 48, the logic determines whether the selected element is selected relatively more or less frequently by a user of the CE device upon which the user interface is presented than neighboring elements on the user interface.

If the logic determines at diamond 48 that an element is selected relatively more frequently by a user of the CE device (e.g., for a purpose other than characterization) than neighboring elements on the user interface, the logic may distinguish the appearance of the element relative to neighboring elements on the user interface. The logic may distinguish the appearance of the element by presenting the element on the user interface in a particular color, presenting the element in greater contrast (e.g., bolder) relative to neighboring elements, presenting the element in relatively larger size and/or text relative to neighboring elements, and/or orientate the element relatively different than neighboring elements. Further, it is to be understood that, in non-limiting embodiments, elements may be orientated horizontally on the display and/or vertically on the display.

However, if the logic of FIG. 2 determines at diamond 48 that an element on the user interface is selected relatively less frequently by a user of the CE device than neighboring elements, the logic may present the element on the user interface in another color, present the element in relatively lighter contrast than neighboring elements, present the element in relatively smaller size and/or text than neighboring elements, and/or orientate the element relatively different than neighboring elements. Even further, an element may be dynamically altered in accordance with present principles so that it may appear as a first size at a first time and as a second size at a second time responsive to a change in the frequency of selection of the element.

It is to be understood that the elements described herein, and particularly in reference to FIG. 2, may be alpha-numeric, where each element may include plural alpha-numeric characters arranged in a row. Furthermore, each alpha-numeric character of a particular element may be collectively associated with the same process, command, and/or function that is associated with the element as a whole. Thus, selecting, by means of, e.g., a point-and-click device or a finger touching a touch-screen display; any character or groups of characters in, an element causes the processor to execute the same action regardless of which character of the element has been selected.

For instance, selecting any one or more of "M," "U," "S," "I," or "C" in the "music" element may cause the processor to execute the same set of commands as it would execute responsive to selection of any other character in that element, which might be, in the case of "music," as an example, invoking an audio decoder and causing music to be played on the speakers of the CE device. Similarly, selecting any character "c," "b," or "s," in the "CBS" element may result in the same processor action regardless of which character in that element is selected, e.g., invoking an MPEG decoder to receive streaming video from a CBS website or TV channel and presenting the video on the display.

It is to be further understood that the frequency determination in accordance with present principles may be based on either or both the frequency of selection of a particular element on the presently described user interfaces and the frequency of selection of the process, command, and/or function associated with the element through other means on the CE device. Moreover, it is to be further understood that "neighboring elements," as referred to herein, may include all the elements presented on a user interface and/or only elements immediately adjacent to the element being described.

Moving on to FIG. 3, a flow chart of non-limiting logic for determining whether an element has been selected a threshold number of times to be presented on a user interface in accordance with present principles is shown. Beginning with block 56, the logic selects an element on a CE device to analyze. Then at decision diamond 56, the logic determines whether the element or its associated process, command, and/or function has been selected a threshold number of times by a user of the CE device to place the element on a user interface, where the user interface is configured in accordance with present principles.

It is to be understood that the threshold described herein may be predetermined in non-limiting embodiments. Thus, in non-limiting embodiments, the threshold may be determined by a consumer electronics device user, a manufacturer of a consumer electronics device, and/or a designer of the software used by a consumer electronics device.

Regardless of how the threshold is determined, if the logic determines at diamond 56 that the element has been selected a threshold number of times, the logic moves to block 58. At block 58, the logic presents or includes the element on a user interface configured in accordance with present principles. If, however, the logic determines at diamond 56 that the element has not been selected a threshold number of times, the logic instead moves to block 60. At block 60, the logic does not present or include the element on the user interface.

It is to be understood that, after either blocks 58 or 60 in FIG. 3, the logic may conclude. Alternatively, the logic may revert to block 54 to select another element to analyze. Additionally, the logic may also proceed to the logic described in FIG. 2 after block 58 in order to characterize the element for presentation on a user interface.

Now in reference to FIG. 4, a flow chart of non-limiting logic for presenting an element on a user interface based at least in part on user preference is shown. Beginning at block 62, the logic may receive input from a user of a consumer electronics device to include an element on a user interface configured in accordance with present principles. The logic may then move to block 64, where the logic presents and/or includes the element on the user interface.

After block 64 of FIG. 4, the logic may conclude. Alternatively, the logic may revert to block 62 and receive user input to present or include another element on the user interface. Additionally, the logic may also proceed to the logic described in FIG. 2 to characterize the element for presentation on the user interface.

Now in reference to FIG. 5, a flow chart, of non-limiting logic for highlighting and/or filtering elements on a user interface configured to further distinguishing particular elements in accordance with present principles is shown. Generally, it is to be understood that elements described in reference to FIG. 5 may represent respective categories, and that the predetermined elements of categories belonging to a common genre may be highlighted for a predetermined period, after which the predetermined elements cease to be highlighted and the predetermined elements are thereafter presented in non-highlighted form. It is to be further understood that multiple elements may belong to the same category, and, even further, that an element may belong multiple categories.

Still in reference to FIG. 5, the term "tag," as used herein, may collectively or alternatively refer to the afore-mentioned categories and genres in non-limiting embodiments, such that a tag representing a particular category or genre as described herein represents an identifying characteristic and/or information associated with an element. In non-limiting embodiments, the tag may also include metadata associated with the element or the element's process, command, and/or function.

Beginning at block 66 of FIG. 5, the logic receives input from a user of a consumer electronics device to present to the user only those elements on the user interface associated with a desired, optionally predetermined tag(s) in accordance with present principles, thereby concealing elements on the user interface not associated with a particular tag(s). It is to be understood that each element may be associated with more than one tag.

Still in reference to FIG. 5, the logic then moves from block 66 to block 68. At block 68, the logic presents (or, alternatively highlights) only elements associated with desired tag on the may conceal elements not associated with a particular tag being selected, and only presents those elements associated with the particular tag on the user interface. The presentation performed at block 68 may be temporary, or it may permanent in some non-limiting embodiments. The length of the presentation at block 68 may be determined based, on any number of factors, including a predetermined period of time, or the duration a user selects a particular tag to filter elements to be viewed on a user interface.

Moving on to FIG. 6, a flow chart of non-limiting logic for determining tags that may be associated with a particular element presented on a user interface in accordance with present principles is shown. While it is to be understood that any element described herein may be associated with at, least one default tag that may be determined, e.g., by a consumer electronics device manufacturer, FIG. 6 describes logic that may be used to associate additional and/or replacement tags with an element based on user preference.

Thus, FIG. 6 begins at block 70. At block 70, the logic receives a user's selection of an element with which to associate an additional and/or different tag(s) with an element. Moving to block 72, the logic prompts the user to determine a tag(s) to associate with the selected element. The prompt disclosed herein will be described in further detail in reference to FIG. 7. Regardless, after providing a prompt at block 72, the logic moves to block 74, where the logic receives a user's selection of one or more tags to associate with the element, and associates the tag(s) with the element accordingly.

Now in reference to FIG. 7, a non-limiting block diagram of an exemplary prompt provided to a user to determine a tag(s) to associate with an element in accordance with present principles is shown. The prompt generally designated 76 may include instructions, such as the instructions 78 shown in FIG. 7, indicating that a user should determine tags to associate with a particular element. In the non-limiting exemplary prompt shown in FIG. 7, a user may thus choose tags from a list 80 containing tags generally designated. X, Y, and Z. Also as shown in FIG. 7, the prompt may provide a user with a means for entering a user-defined tag to associate with a particular element through an entry space 82, the space 82 also including an enter button 84 in non-limiting embodiments.

Figure 8:
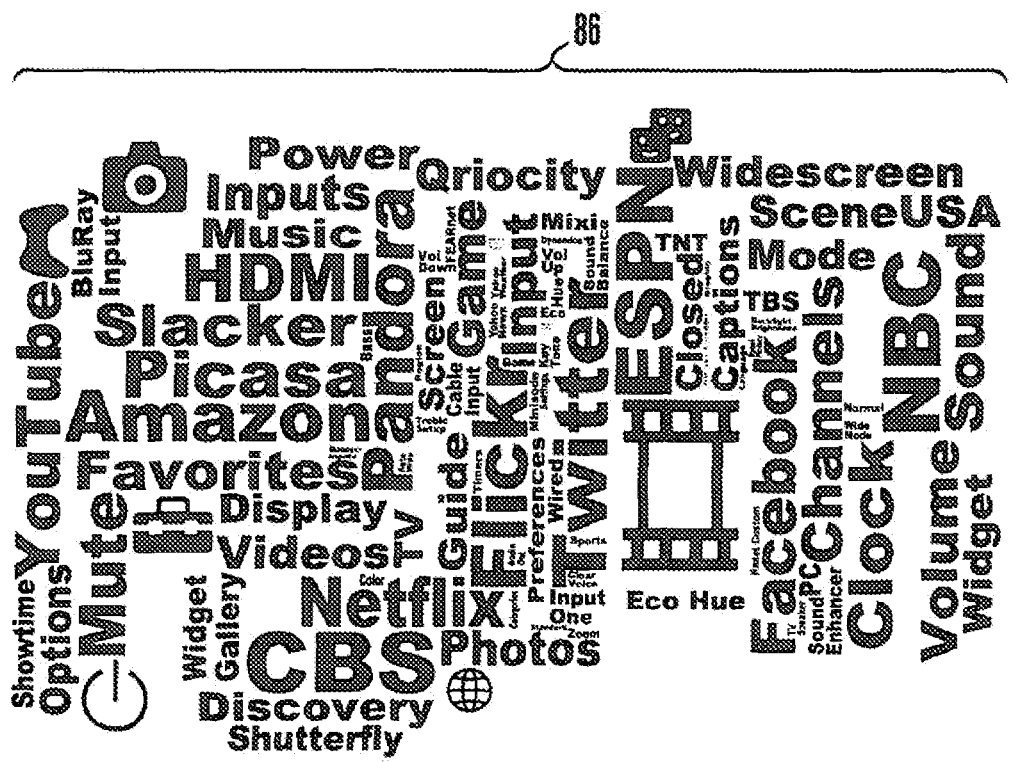
FIG. 8 is a non-limiting exemplary user interface in accordance with present principles.

Moving on to FIG. 8, a non-limiting exemplary user interface in accordance with present principles is shown. Thus, the user interface 86 includes elements in various sizes, contrasts, and orientation relative to each other. Thus, it may be appreciated that certain elements are larger than others, in darker and/or bolder contrast compared to others, and orientated horizontally while others are orientated vertically.

It is to be understood that the elements shown in the non-limiting exemplary user interface 86 may be presented on the user interface 86 because the elements have been previously selected a threshold number of times either through the user interface 86 or through other means on the consumer electronics device. It is to be further understood that the elements shown on the user interface 86 may be presented on the interface 86 based on user preference in accordance with present principles.

Figure 9:
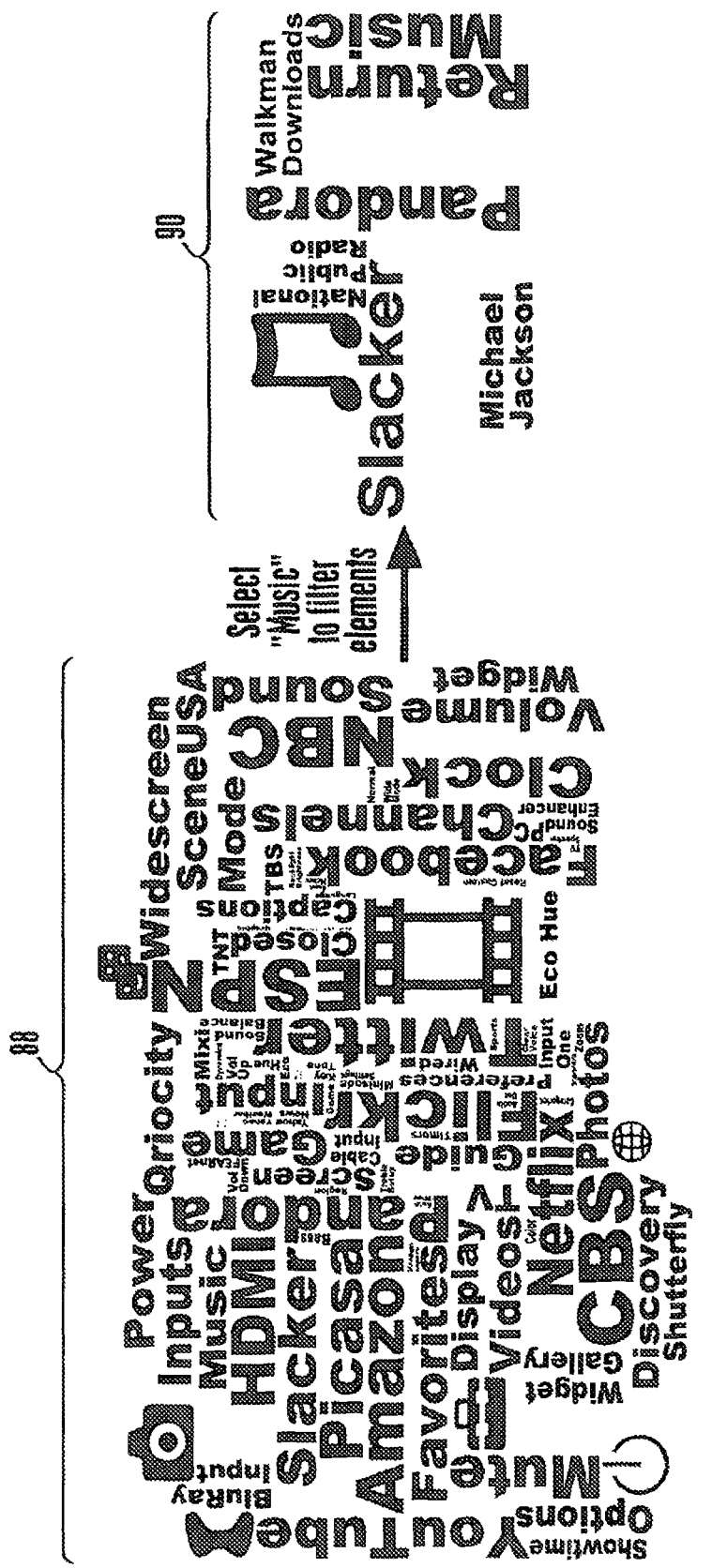
FIG. 9 is another non-limiting user interface in accordance with present principles.

A second non-limiting user interface in accordance with present principles is shown in FIG. 9. FIG. 9 demonstrates anon-limiting user interface in accordance with the principles described in reference to FIG. 5, where particular elements on a user interface may be further distinguish by temporarily concealing otherwise viewable neighboring elements and only presenting those elements associated with a particular tag. However, it is to be understood that description of FIG. 9 is not to be limited to the principles in accordance with FIG. 5.

According to present principles, filter elements are temporary characteristics, applied to all UI elements, that show "similar" elements and mask all other elements that are 'unsimilar'. It is determined by the system what items are "similar" beforehand. In most of the disclosed examples the filter elements are the icons (FIG. 9) and the large generic text (FIG. 9), e.g., "Music", "Picture", "Settings". Filter elements do not add new elements to existing UI, but skew the visual characteristics of the elements (size, orientation, etc.) so that less common elements can be found easier.

FIG. 9 shows a user interface generally designated 88 that may be substantially similar in function and configuration as the user interface 86 described above. FIG. 9 also shows user interface 90, where particular elements are distinguished by temporarily concealing otherwise viewable neighboring elements. It may therefore be appreciated that certain elements that are viewable on user interface 88 are not viewable on the "filtered" interface 90. However, it may be further appreciated that some of the same elements viewable on user interface 88 are also viewable on the "filtered" user interface 90. Even further, in non-limiting embodiments, still other elements associated with a particular tag may be presented on the user interface 90 that may not have be presented on user interface 88.

While the particular APPARATUS AND METHOD FOR PRESENTING MENU ITEMS ON USER INTERFACE OF CONSUMER ELECTRONICS DEVICE is herein shown and described in detail, it is to be understood that the subject matter which is encompassed by the present invention is limited only by the claims.

What is claimed is:

1. A consumer electronics (CE) device, comprising:
   a video display;
   a processor controlling the display; and
   a computer readable storage medium accessible to the processor and bearing instructions executable by the processor to cause a user interface (UI) to appear on the display, the UI including plural alpha-numeric elements, each element including plural alpha-numeric characters arranged in a row, each element being characterized by a color, a row orientation, and a size, at least the size being established at least in part by a frequency of selection of an element, at least a first element having a first color, first size, and first row orientation and at least a second element having a second color, second size, and second row orientation respectively different from the first color, first size, and first row orientation.

2. The CE device of claim 1, wherein each element is further characterized by a contrast, the contrast of at least one element being established at least in part by a frequency of selection of the element.

3. The CE device of claim 1, wherein the first row orientation is horizontal on the display and the second row orientation is vertical on the display.

4. The CE device of claim 2, wherein the contrast is lighter for a first element that is selected relatively less frequently and darker for a second element that is selected more frequently than the first element.

5. The CE device of claim 1, wherein responsive to a determination that the first element is selected more frequently than the second element, the processor establishes the first size to be larger than the second element.

6. The CE device of claim 1, wherein the processor dynamically alters at least the first and second sizes responsive to user selections of the elements.

7. The CE device of claim 1, wherein the elements represent respective categories, and the processor highlights predetermined elements of categories belonging to a common genre for a predetermined period, after which the processor ceases to highlight the predetermined elements and presents the predetermined elements in non-highlighted form.

8. A method, comprising:
   providing a consumer electronics (CE) device having a video display;
   providing a processor controlling the display;
   providing a computer readable storage medium accessible to the processor and bearing instructions executable by the processor to cause a user interface (UI) to appear on the display;
   wherein the user interface includes plural alpha-numeric elements, each element including plural alpha-numeric characters arranged in a row;
   wherein responsive to a first element on the user interface being selected the processor determines whether the first element is selected relatively more frequently than neighboring elements on the user interface; based at least in part on the frequency on which the first element is selected for a purpose other than characterization of the first element, presenting the first element on the display in a color, size, and row orientation keyed to the frequency.

9. The method of claim 8, wherein the first element is distinguished on the user interface by presenting the element in greater contrast relative to other elements, wherein the contrast is established at least in part by bolding the first element relative to other elements.

10. The method of claim 8, wherein the first element is distinguished on the user interface by presenting the element in relatively larger size on the user interface than neighboring elements.

11. The method of claim 8, wherein the first element is presented on the user interface when it has been selected on the CE device for a purpose other than characterization a threshold number of times.

12. The method of claim 8, wherein the first element is presented on the user interface based at least in part on user preference.

13. The method of claim 8, wherein the first element is distinguished on the user interface by temporarily concealing an otherwise viewable at least second element on the user interface.

14. The method of claim 8, wherein predetermined plural elements on the user interface including the first element are associated with a tag, wherein the tag at least in part includes identifying information common to the plural elements, wherein the plural elements associated with the tag are distinguished on the user interface by only presenting the plural elements associated with the tag on the user interface for a predetermined time.

15. A system, comprising:
   a consumer electronics (CE) device;
   wherein the CE device includes a video display and a processor controlling the display;
   wherein the CE device includes a computer readable storage medium accessible to the processor and bearing instructions executable by the processor to cause a user interface (UI) to appear on the display, the UI including plural alpha-numeric elements, each element including plural alpha-numeric characters arranged in a row; and
   wherein the appearance of each element on the UI is established at least east in part by the frequency of selection of the element.

16. The system of claim 15, wherein the appearance of each element on the UI is characterized at least in part by a color, a row orientation, and a size.

17. The system of claim 16, wherein at least a first element has a first color, first size, and first row orientation and at least a second element has a second color, second size, and second row orientation respectively different from the first color, first size, and first row orientation.

18. The system of claim 17, wherein the first row orientation is horizontal on the display and the second row orientation is vertical on the display.

19. The system of claim 16, wherein the processor dynamically alters the size of an element responsive to user selection of the element.

20. The system of claim 15, wherein the elements represent respective categories, and the processor highlights predetermined elements of categories belonging to a common genre for a predetermined period, after which the processor ceases to highlight the predetermined elements and presents the predetermined elements in non-highlighted form.

\* \* \* \* \*